(12) United States Patent
Riikonen

(10) Patent No.: US 6,839,545 B2
(45) Date of Patent: Jan. 4, 2005

(54) TRANSMISSION METHOD OF RECEPTION INFORMATION ON COMMUNICATION CONNECTION

(75) Inventor: Jarmo Riikonen, Oulu (FI)

(73) Assignee: Nokia Mobile Phones Ltd., Espoo (FI)

(*) Notice: Subject to any disclaimer, the term of this patent is extended or adjusted under 35 U.S.C. 154(b) by 613 days.

(21) Appl. No.: 09/727,889

(22) Filed: Dec. 1, 2000

(65) Prior Publication Data

US 2001/0051506 A1 Dec. 13, 2001

(30) Foreign Application Priority Data

Dec. 3, 1999 (FI) .............................. 19992612

(51) Int. Cl.⁷ .............................................. H04B 17/00
(52) U.S. Cl. ................... 455/67.11; 455/67.16; 455/63.1; 455/67.13; 455/504; 455/436; 455/506; 455/513; 455/522
(58) Field of Search ................... 455/67.11, 67.16, 455/67.13, 67.14, 13.4, 10, 63.1, 436, 504, 506, 513, 522

(56) References Cited

U.S. PATENT DOCUMENTS

| | | | | |
|---|---|---|---|---|
| 5,737,359 A | * | 4/1998 | Koivu | 375/133 |
| 5,794,149 A | * | 8/1998 | Hoo | 455/438 |
| 6,031,827 A | * | 2/2000 | Rikkinen et al. | 370/330 |
| 6,198,910 B1 | * | 3/2001 | Hanley | 455/67.11 |
| 6,253,086 B1 | * | 6/2001 | Parantainen et al. | 455/446 |
| 6,339,697 B1 | * | 1/2002 | Ranta | 455/63.1 |
| 6,366,779 B1 | * | 4/2002 | Bender et al. | 455/450 |
| 6,373,930 B1 | * | 4/2002 | McConnell et al. | 379/114.28 |
| 6,442,397 B1 | * | 8/2002 | Benveniste | 455/522 |
| 6,449,462 B1 | * | 9/2002 | Gunnarsson et al. | 455/67.13 |
| 6,526,039 B1 | * | 2/2003 | Dahlman et al. | 370/350 |
| 6,603,751 B1 | * | 8/2003 | Odenwalder | 370/331 |

* cited by examiner

Primary Examiner—Marceau Milord
(74) Attorney, Agent, or Firm—Perman & Green, LLP

(57) ABSTRACT

A wireless communication system includes at each cell at least one network part of the system communicating with subscriber terminals in its area. Within the system, a method for transmitting reception information on a receiving end to a transmitter includes measuring the quality of a signal received from a terminal, such as the bit error ratio (BER) of the signal, and transmitting the measured quality information to the terminal to be indicated to the user of the terminal, or transmitting an announcement selected on the basis of the quality information to the terminal via the network part to be indicated to the user.

16 Claims, 4 Drawing Sheets

TRANSMISSION METHOD OF RECEPTION INFORMATION ON COMMUNICATION CONNECTION

FIELD OF THE INVENTION

The invention relates to a method of transmitting reception information about the receiving end on a communication connection to the transmitter in a wireless communication system.

BACKGROUND OF THE INVENTION

In wireless communication system environments, such as cellular radio environments, the conditions under which radio waves propagate typically vary continually, which causes variation as a function of time and place, i.e. fading, in a radio signal. Changes occurring in the impulse response of a channel may be caused either by physical changes in the medium (variation of the refractive index of the medium as a function of temperature, pressure and partial pressure of water vapour, for example) or changes in the geometry of the connection (movement of the transmitter or receiver or obstacle on the connection). Fading can be fast or slow, and usually both types of fading occur on a radio channel simultaneously.

Fast fading of a signal is caused by multipath propagation characteristic of the cellular radio environment, wherein the signal propagates via several different routes between a transmitter and a receiver. Such a channel is called Rayleigh fading channel (comprises only multipath-propagated signal components) or Rice fading channel (a received signal also comprises a stable part, i.e. a directly propagated part or a strongly mirror-reflected part). The different signal components comprising different amplitudes and phases are summed at the receiver and, depending on the phase differences between the signal components, they either amplify or attenuate each other, thus making the level of the sum signal vary considerably, up to dozens of decibels even over as short a distance as half a wavelength. Fast fading is typical particularly of urban areas with many reflecting surfaces, such as walls of tall buildings. FIG. 1 shows an example of a multipath propagation environment of the Rice type, wherein from the output of a subscriber terminal 110, the receiver antenna of a base station 100 receives a directly propagated signal component 106 and signal components 102 and 104 reflected from the walls of buildings 108. Naturally, the number of the multipath-propagated signals can be other than two. Fast fading causes the signal level to abruptly and dramatically drop typically at intervals of half a wavelength, at 17-centimeter intervals within the frequency range of 900 MHz of a GSM system, for example. The signal level can drop even below the dynamic sensitivity level of the receiver, in which case the signal will be lost.

Slow fading of a signal is, in turn, caused by the fact that the propagation path of a radio signal comprises a varying number of different factors causing attenuation, typically natural obstacles or buildings. The effect of slow fading on the propagating signal is at least one grade slower than the variation in the signal level caused by fast fading.

Owing to variations in a radio channel and also to handovers (a moving subscriber terminal moves from one cell to another during a communication connection and changes base stations) typical of the cellular radio system, different equipment in a wireless communication system, such as base stations and subscriber terminals of the radio channel, measure the quality of a received signal at regular intervals with different counting methods, for example by calculating the ratio of the number of erroneous bits to the number of received ones (BER), or by measuring the level of the received signal. In the GSM systems, for example, a base station transmits the measurement information about the signal received from the subscriber terminal to a base station controller, which, on the basis of the received information, can, for example, command the subscriber terminal to perform handover or to raise the transmission power. If the signal received by the base station from the subscriber terminal is weak because the location of the subscriber terminal is disadvantageous to the propagation of the signal, raising the transmission power may not suffice and, owing to the increased level of interference, it can even be harmful to the other users of the network. In addition, it is advantageous to keep the power consumption of a portable terminal as low as possible; therefore, it is advisable to favour other solutions to ensure reception.

In the existing radio communication systems and in those being developed, a great disadvantage is that no information on the quality of a signal received by the network part of the system is transmitted to the transmitter of the message. The only measurement information transmitted to the user of the subscriber terminal is about a signal received, but not transmitted, by the terminal. In mobile telephone systems, for example, on the display of a subscriber terminal there is typically an indicator comprising a line of bars, the number of bars therein indicating the strength of the received signal, i.e. the field strength of the transmitting antenna of the base station, but no information on the quality of the signal transmitted by the subscriber terminal is indicated on the display of the subscriber terminal. If the connection is poor because of a low level of the signal received by the base station receiver, the call may deteriorate at the receiving end such that letters or even entire words are lost of the received speech. In this case, the user of the subscriber terminal does not necessarily know that the quality of the connection has deteriorated since, for example, he or she may receive the speech of the other party well when the power of the antenna of the base station or transmitter is greater than that of the power of the antenna or transmitter of the terminal in his or her use. Nor does the transmitter of a data message receive any information about the reason why the transmission of his or her messages fails or retransmissions take time. Hence, it is not possible for the establisher of the connection to affect the quality of the radio channel he or she uses for example by searching the most advantageous spot in view of reception; in many cases, such a spot could actually be found in the vicinity.

BRIEF DESCRIPTION OF THE INVENTION

An object of the invention is thus to provide a method and an apparatus implementing the method such that in wireless communication systems, such as in cellular radio systems, the user of terminal equipment receives information on the quality of transmission of the equipment he or she uses. This is achieved by a method of the invention for transmitting reception information on a communication connection in a wireless communication system, in which system a message signal is transmitted from a transmitting terminal to a network part of the system, the quality of the message signal received by the network part of the system is measured, quality information measured from the message signal transmitted by the transmitting terminal is transmitted to the transmitting terminal by the network part of the system, and the quality information transmitted to the terminal is indicated to the user of the terminal.

This object is achieved also by a method of the invention for transmitting reception information on a communication connection in a wireless communication system, in which system a message signal is transmitted from a transmitting terminal to a network part of the system, the quality of the message signal received by the network part of the system is measured, quality information on the message signal of the transmitting terminal measured by the network part of the system is transmitted to a control unit of the system, a suitable announcement is selected by the control unit on the basis of the quality information the network part of the system has measured from the received message signal and has transmitted to the control unit of the system, the announcement selected by the control unit of the network is transmitted to the transmitting terminal, and the announcement selected by the control unit of the system is indicated to the user of the transmitting terminal.

A communication system of the invention is a wireless communication system, in which system a transmitting terminal is arranged to transmit a message signal to the network part of the system, the network part of the system is arranged to measure the quality of the received message signal, the network part of the system is arranged to transmit the measured quality information to the transmitting terminal, and the transmitting terminal is arranged to indicate the quality information to the user of the transmitting terminal.

A communication system of the invention is a wireless communication system, in which system a transmitting terminal is arranged to transmit a message signal to the network part of the system, the network part of the system is arranged to measure the quality of the received message signal, the network part of the system is arranged to transmit the measured quality information to the control unit of the network, the control unit of the system is arranged to select a suitable announcement on the basis of the quality information, the control unit of the system is arranged to transmit the announcement to the network part of the system, the network part of the system is arranged to transmit the announcement to the transmitting terminal, and the transmitting terminal is arranged to indicate the announcement to the user of the terminal.

The preferred embodiments of the invention are disclosed in the dependent claims.

Several advantages are achieved by the method and system of the invention. If the user of the terminal receives information on the quality of the telecommunication connection he or she uses, the user can, if desired, actively improve the quality for example by finding the most preferable spot in view of reception, for example by moving closer to a window or out of a lift when in a building; when outdoors, by moving away from the shadow region of a tall building or just by taking a few steps away from the signal level minimum occurring at intervals of half a wavelength, which is typical of multipath propagation. The user of the terminal thus also receives information on the coverage area of the network and can, if desired, select a network operator providing the most suitable coverage area.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

Figure 2:
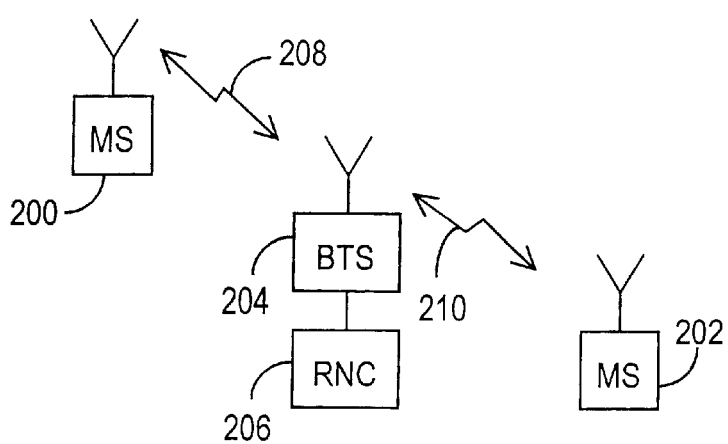
FIG. 2 illustrates an example of a telecommunication system to which the invention can be applied.

The present invention can be used in different wireless communication systems, such as cellular radio systems, wherein terminal equipment comprise different radio path characteristics. The multiple access method used in the system is irrelevant; CDMA, WCDMA and TDMA, for example, are possible alternatives. It is also obvious to one skilled in the art that the method of the invention can also be applied to systems using different modulation methods or air interface standards. In a simplified manner, FIG. 2 illustrates a digital data transmission system whereto the solution of the invention can be applied. The system concerned is part of a cellular radio system comprising a base station 204 having a bidirectional connection 208 and 210 to subscriber terminals 200 and 202 that can be fixedly positioned, located in a vehicle or portable terminals to be carried around. The base station further communicates with a base station controller 206, which relays subscriber terminal connections to the rest of the network. In a centralized manner, the base station controller controls a plurality of base stations communicating therewith. The base station comprises, for example, transceivers and a multiplexer unit, which places traffic and control channels used by several transceivers to one transmission connection. The transceivers of the base station communicate with an antenna unit, which implements the duplex radio connection to the subscriber terminal. The cellular radio system can also communicate with a public telephone network.

Figure 3:
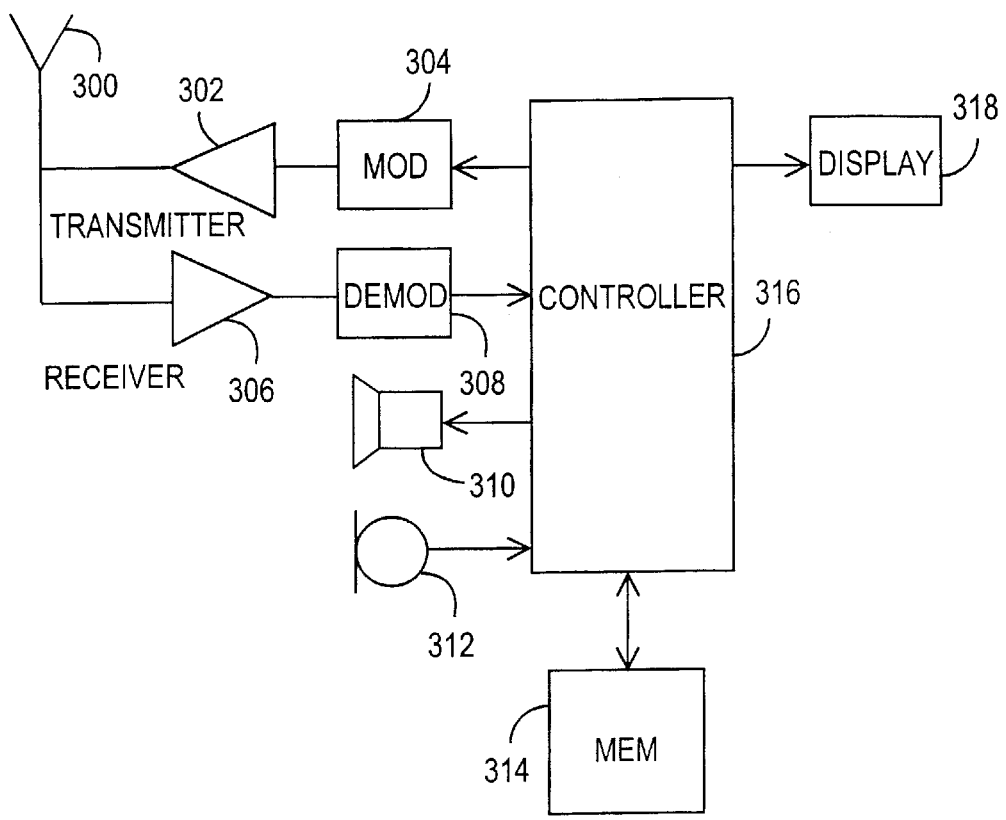
FIG. 3 is a block diagram illustrating the structure of a terminal in a wireless communication system of the invention, such as a cellular radio system.

FIG. 3 illustrates a terminal of a wireless communication system, such as a cellular radio system, whereto the method of the invention can be applied. The terminal can a mobile telephone or a microcomputer, for example, without being restricted thereto. The terminal comprises an antenna 300 whereby signals are both transmitted and received via a duplex filter. The terminal further comprises a transmitter 302, which amplifies and transmits a modulated signal to the antenna, a modulator 304 modulating the carrier wave by a data signal comprising the desired information in accordance with a selected modulation method, a receiver 306 which amplifies the signal supplied from the antenna and down-mixes the signal to a selected intermediate frequency or directly to baseband, a demodulator 308 demodulating the received signal to enable a data signal to be separated from the carrier wave, a controller part 316 comprising, for example, control and calculation means for controlling the operation of the different parts of the terminal, means for processing the speech of the user or the data generated by the user, such as a digital signal processing DSP processor comprising, for example, channel correction functions to compensate for interference in the signal caused by the radio channel by utilising information on the channel obtained by a known training sequence, A/D converters converting an analogue signal into a digital one by sampling and quantizing the baseband signal, D/A converters converting a digital signal to an analogue one by a reverse method, filters which, at the receiver, filter frequencies outside a desired frequency band or which, in band-restricted systems, restrict the band width of the output at the transmitter, and coding and decoding means for performing both channel and speech coding. In channel coding, systematic bit redundancy added to a signal, typically parity bits, is used to indicate and correct errors at a decoder. In speech coding, for example in source coding, non-systematic redundancy in source symbols is typically removed in order to reduce the necessary bit rate. Furthermore, in spread-spectrum systems, such as WCDMA, the spectrum of the signal is spread at the transmitter by means of a pseudo-random spreading code over a wide band and despread at the receiver, thus trying to increase the channel capacity. Coding can also be used to encrypt the output or the information contained therein. In addition, the control part in the equipment according to the GSM system typically comprises means for generating bursts, which add the tail bits of a burst and the training sequence to the data supplied from a channel codec. The control part also comprises means for arranging the signal to be transmitted and the signalling information to conform to the air interface standard of the cellular radio system used. The terminal described above is a terminal in a digital cellular radio system, but the invention can be applied to an analogue system in a similar manner.

The user interface of the terminal comprises a loudspeaker or an earpiece 310, a microphone 312, a display 318 and possibly a keypad, which communicate with the control part. In accordance with the invention, quality information to be transmitted to the user of the terminal is indicated by means of the user interface with, for example, a voice signal through the loudspeaker or the earpiece, or by an appropriate icon or other visual means on the display. The terminal also comprises several different memory elements that are shown as one functional block 314. The memory element comprises stored data, for example, such as messages supplied to the user from the network part of the system. Part of the memory element can also be used as a buffer memory of the display. The memory element also comprises software controlling the operation of the terminal and comprising, for example, subprograms typically responsible for various tasks related to controlling the display. The functions in the terminal according to the invention can typically be implemented by software by providing the control unit of the terminal with software comprising the necessary commands.

Figure 4:
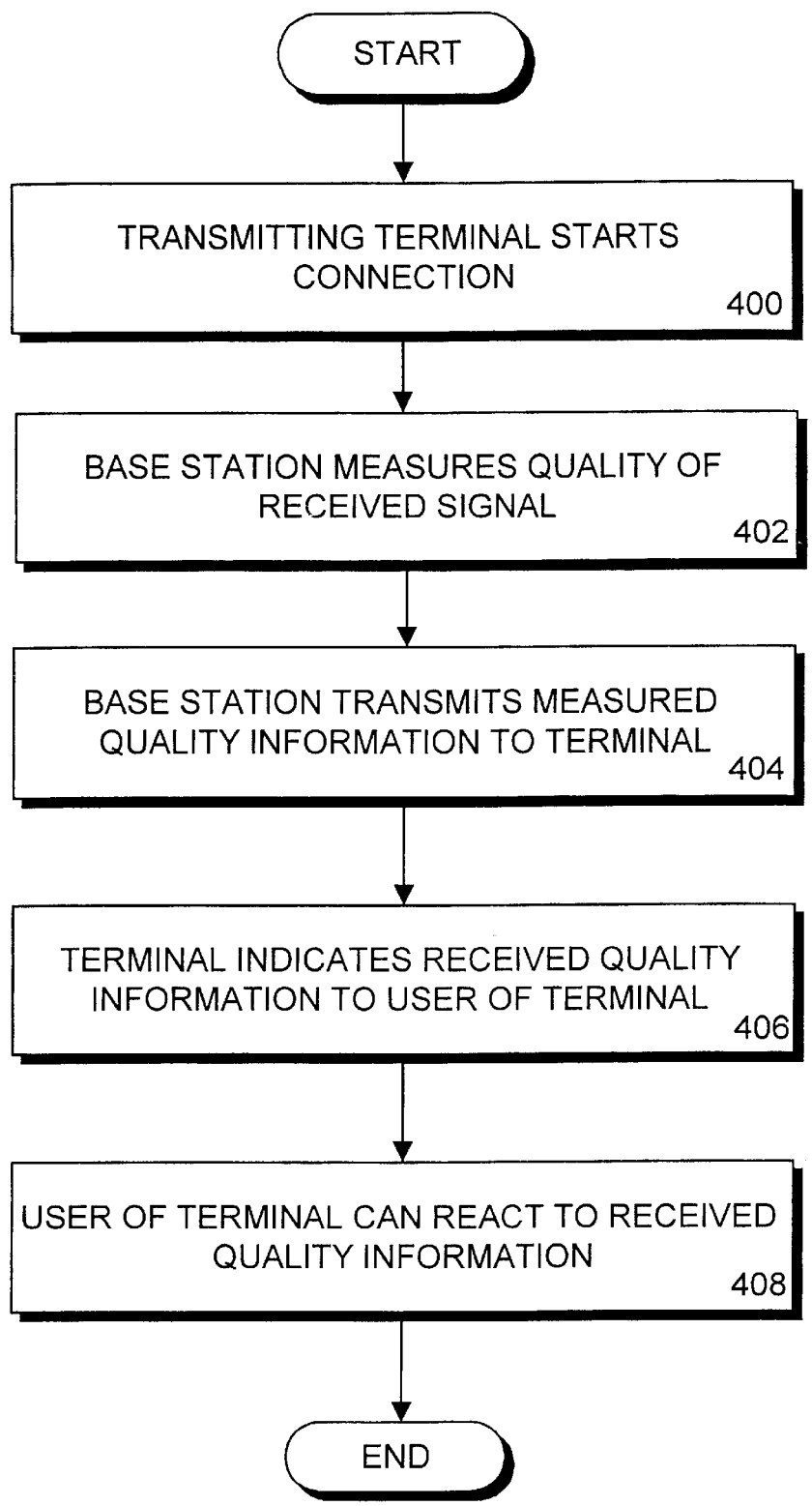
FIG. 4 is a flow diagram of an embodiment of the invention.

FIG. 4 illustrates a preferred embodiment of the invention. Transmission 400 of a data message or a speech message is first started from a transmitting terminal to another terminal in a wireless communication system or to a terminal in a fixed network, which can, for example, be a telephone or a device receiving data messages, such as a microcomputer having a modem connection to the fixed network. In wireless communication systems, such as cellular radio systems, the transmitted message travels through the network part, which is called a base station in FIG. 4. The network part can also be another part of the communication system used than the base station presented in the present description of the preferred embodiment of the invention. The base station measures the quality of the signal received from the transmitting terminal using various methods, such as counting the ratio of the number of erroneous bits to the number of received bits (BER) or measuring the level 402 of the received signal. In the existing systems, base stations already employ these measurement methods. According to the invention, the network part of the system transmits the measured quality information a transmitting terminal 404 and the terminal indicates this quality information to the user of the terminal for example in manners 406 disclosed later. Next, the user of the terminal can actively improve the quality of the transmitted signal, if necessary 408.

Figure 5:
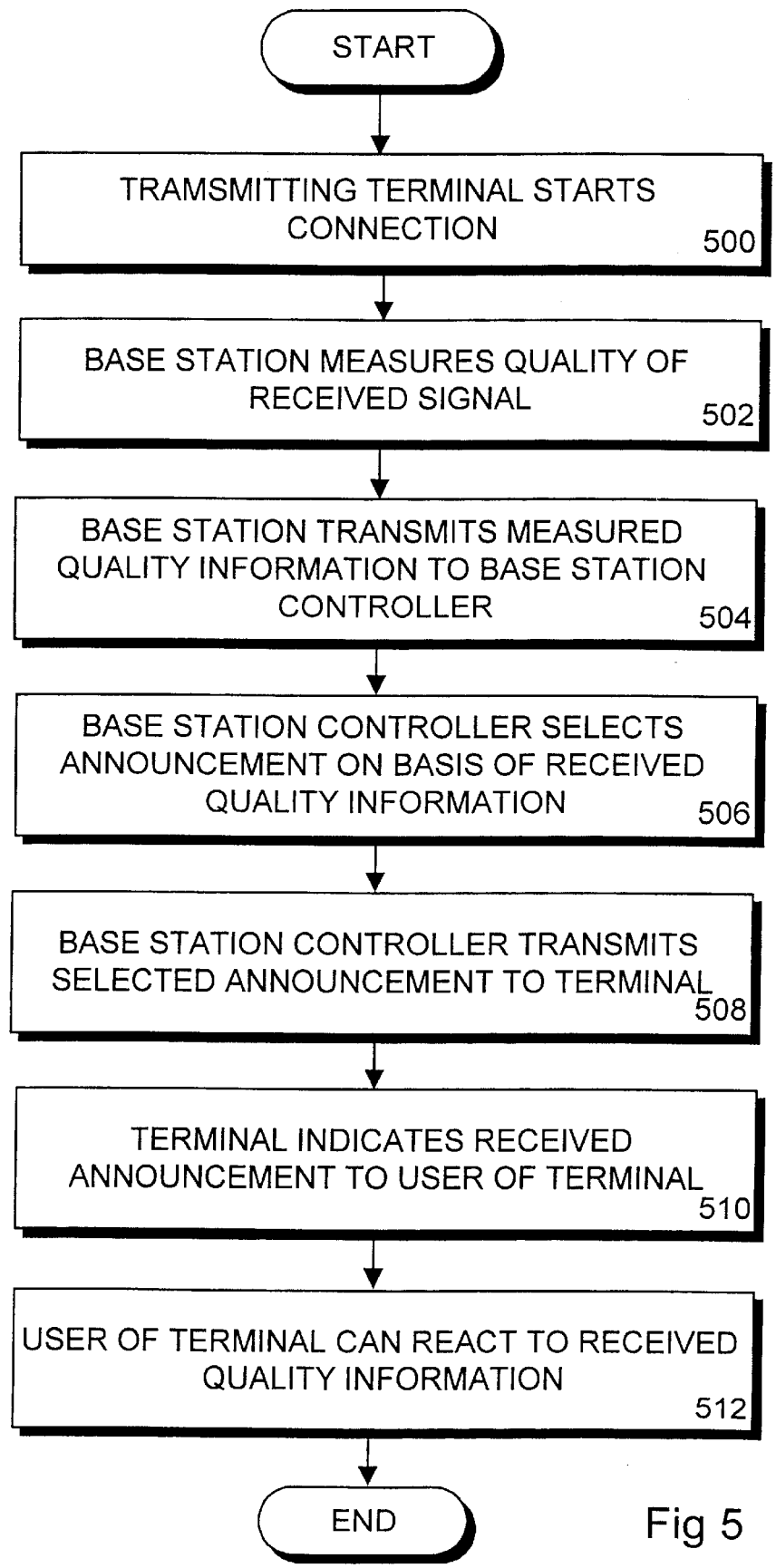
FIG. 5 is a flow diagram of another embodiment of the invention.

FIG. 5 illustrates another preferred embodiment of the invention. Also in this embodiment, transmission 500 of a data message or a speech message is first started from a transmitting terminal to another terminal in a wireless communication system or to a terminal in a fixed network, which can be, for example, a telephone or a device receiving data messages, such as a microcomputer having a modem connection to the fixed network. In wireless communication systems, such as cellular radio systems, the transmitted message travels through the network part, which is called a base station in FIG. 5. The base station measures the quality of the signal received from the transmitting terminal using various methods, such as counting the ratio of the number of erroneous bits to the number of received bits (BER) or measuring the level 502 of the received signal. In the existing systems, base stations already employ these measurement methods. Next, the base station transmits the quality information measured already in the prior art systems to the control unit of the system, which is called a base station controller 504 in FIG. 5. According to the invention, the base station selects a suitable announcement on the basis 506 of the quality information received from the base station. Typically, the announcement indicates that the reception is poor or that action is required. Next, the base station controller transmits the announcement to a terminal 508, which then indicates the received announcement to the user of the terminal for example in manners 510 disclosed later. Hence, the user of the terminal can, if desired, actively improve the quality of reception 512 of the signal received by the base station from his or her terminal.

The functions of the invention in the network part or the control unit of the system can typically be implemented by software by providing the control unit of the network part or the control unit with software comprising the necessary commands.

There are many different ways in which the terminal can indicate the quality information received from the network part of the system, for example from the base station, or the announcement received from the control unit of the system, for example from the base station controller. For the indication, for example a voice signal can be used, either a single beep whose volume or frequency of occurrence may vary, or another kind of voice signal, such as a tune or a verbal message chosen by the user of the terminal himself or herself or by the system. For the indication, the terminal can use a visual signal, such as an icon or an indicator comprising a line of bars, the number of bars therein indicating the quality of the signal. The icon can be a single moving or still image or series of images. A variation in the shape of the icon can also be utilised for transmitting information. Also a light signal, which can be, for example, a change in the brightness or colour of the background light or part thereof or a separate light which goes on and off continually or periodically and which can be implemented by a led, for example, can be used to implement the indication. A vibration function or a change in the comfort noise level can also be used for the indication.

Figure 1:
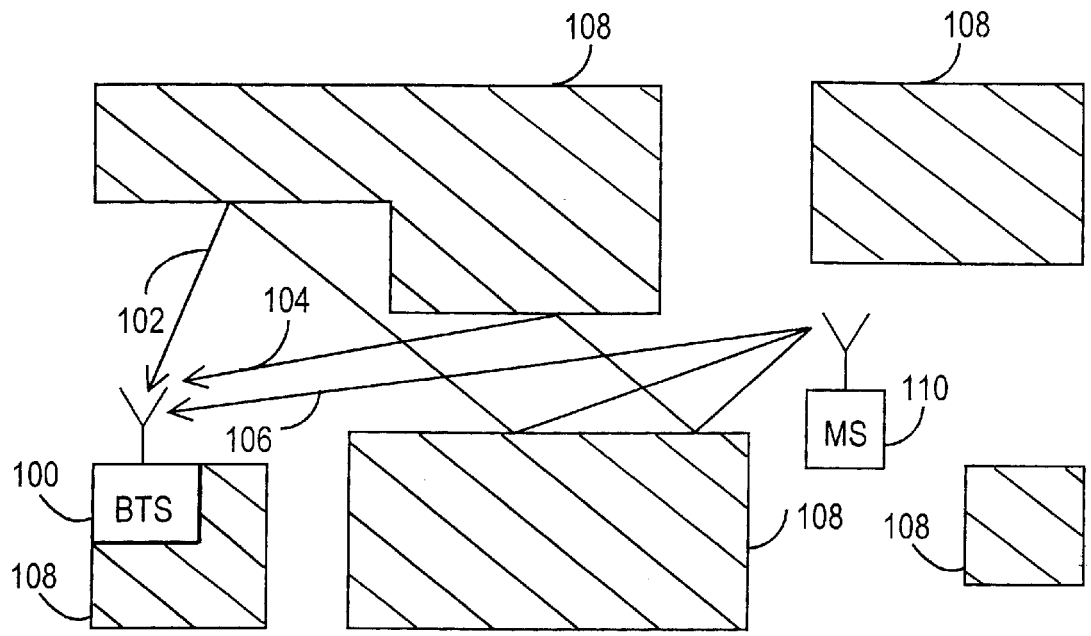
FIG. 1 illustrates the example of a typical multipath propagation environment described above.
Figure 6:
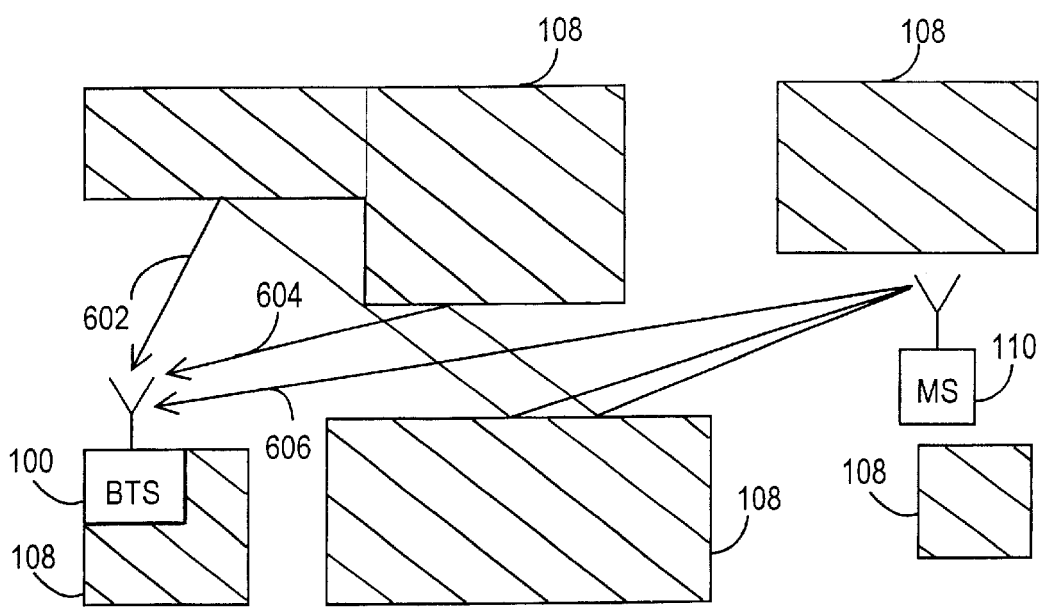
FIG. 6 illustrates an example of how the invention can be applied to a multipath propagation environment.

On the basis of the received information, the user of the terminal can, if necessary, actively affect the quality of the reception of the signal transmitted by the terminal he or she uses by moving away from the shadow region, for example. FIG. 1 shows the multipath propagation environment described above. FIG. 6 illustrates how the movement of a transmitting terminal 110 changes the propagation environment of the signals such that multipath-propagated signal components 602, 604 being summed at the receiver of the base station and a directly propagated signal component 606 have propagated in a different way from that shown in FIG. 1; consequently, the phase differences of the signal components are different from those in FIG. 1. If the movement was advantageous to the reception, i.e. for example away from the fading maximum occurring at intervals of half a wavelength, the quality of the signal received by the base station improved without any rise in the power of the terminal transmitter.

Examine further an example of a message structure whereby the quality information measured by the base station can be preferably transmitted from the base station to the terminal in the GSM system. The quality information measured by the base station can be transmitted from the base station to the terminal by using the SI 6 Rest Octets field of a terminal-specific System Information Type 6 message. The field in question is three bits long. An SI 6 Rest Octets information element may comprise information about, for example, the a paging situation or VBS and VGCS services of a cell. The network transmits the System Information Type 6 message to the terminal on a slow associated control channel SACCH. The contents of the System Information Type 6 message is disclosed in the GSM specification 04.08 in Table 9.35. Point 10.5.2.35a of the specification describes an SI 6 Rest Octets field by means of a compact notation CSN:1 description language. In the following, the point in question will be shown, with the transmission method of quality information of the invention added in italics:

<SI6 rest octets>::={LIH<PCH and NCH info>};
    {LIH<VBS/VGCS options: bit(2)>}
    {LIH<BS_QUALITY:bit(3)>}
    <implicit spare>;

Although the invention has been described above with reference to the example of the accompanying drawings, it is obvious that the invention is not restricted thereto but it can be modified in many ways within the scope of the inventive idea disclosed in the attached claims.

What is claimed is:

1. A method for transmitting reception information on a communication connection in a wireless communication system, comprising:
   a message signal is transmitted from a transmitting terminal to a network part of the system,
   the quality of the message signal received by the network part of the system is measured,
   quality information measured from the message signal transmitted by the transmitting terminal is transmitted to the transmitting terminal by the network part of the system, and
   the quality information transmitted to the terminal is indicated to the user of the terminal.

2. A method as claimed in claim 1 wherein the quality information or the announcement is indicated to the user of the transmitting terminal by a voice signal.

3. A method as claimed in claim 1 wherein the quality information or the announcement is indicated to the user of the transmitting terminal visually by changing the number of bars in an indicator.

4. A method as claimed in claim 1 wherein the quality information or the announcement is indicated to the user of the transmitting terminal by changing the level of comfort noise.

5. A method as claimed in claim 1 wherein the quality information or the announcement is indicated to the user of the transmitting terminal by vibration of the terminal.

6. A method as claimed in claim 1 wherein the quality information or the announcement is indicated to the user of the transmitting terminal by an icon.

7. A method as claimed in claim 1 wherein the quality information or the announcement is indicated to the user of the transmitting terminal by a light signal.

8. A method for transmitting reception information on a communication connection in a wireless communication system, in which system
   a message signal is transmitted from a transmitting terminal to a network part of the system,
   the quality of the message signal received by the network part of the system is measured,
   quality information on the message signal of the transmitting terminal measured by the network part of the system is transmitted to a control unit of the system,
   a suitable announcement is selected by the control unit on the basis of the quality information the network part of the system has measured from the received message signal and has transmitted to the control unit of the system,
   the announcement selected by the control unit of the network is transmitted to the transmitting terminal, and
   the announcement selected by the control unit of the system is indicated to the user of the transmitting terminal.

9. A wireless communication system wherein:
   a transmitting terminal is arranged to transmit a message signal to a network part of the system,
   the network part of the system is arranged to measure the quality of the received message signal,
   the network part of the system is arranged to transmit the measured quality information to the transmitting terminal, and
   the transmitting terminal is arranged to indicate the quality information to the user of the terminal.

10. A system as claimed in claim 9 wherein the transmitting terminal comprises means for indicating the quality information or the announcement to the user of the transmitting terminal by a voice signal.

11. A system as claimed in claim 9 wherein the transmitting terminal comprises means for indicating the quality information or the announcement visually to the user of the transmitting terminal by changing the number of the bars in an indicator.

12. A system as claimed in claim 9 wherein the transmitting terminal comprises means for indicating the quality information or the announcement to the user of the transmitting terminal by changing the level of comfort noise.

13. A system as claimed in claim 9 wherein the transmitting terminal is arranged to indicate the quality information or the announcement to the user of the transmitting terminal by vibration of the terminal.

14. A system as claimed in claim 9 wherein the transmitting terminal comprises means for indicating the quality information or the announcement to the user of the transmitting terminal by an icon.

15. A system as claimed in claim 9 wherein the transmitting terminal is arranged to indicate the quality information or the announcement to the user of the transmitting terminal by a light signal.

16. A wireless communication system wherein:
- a transmitting terminal is arranged to transmit a message signal to a network part of the system,
- the network part of the system is arranged to measure the quality of the received message signal,
- the network part of the system is arranged to transmit the measured quality information to a control part of the network,
- the control part of the network is arranged to select a suitable announcement on the basis of the quality information,
- the control part of the network is arranged to transmit the announcement to the network part of the system,
- the network part of the system is arranged to transmit the announcement to the transmitting terminal, and
- the transmitting terminal is arranged to indicate the announcement to the user of the terminal.

* * * * *